US012679082B2

(12) United States Patent
Brueckl

(10) Patent No.: US 12,679,082 B2
(45) Date of Patent: Jul. 14, 2026

(54) APPLICATION DEVICE DESIGNED TO APPLY A SEAL TO A BODY ELEMENT OF A VEHICLE AND METHOD

(71) Applicant: Bayerische Motoren Werke Aktiengesellschaft, Munich (DE)

(72) Inventor: Thomas Brueckl, Thalmassing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 90 days.

(21) Appl. No.: 18/580,228

(22) PCT Filed: Aug. 2, 2022

(86) PCT No.: PCT/EP2022/071691
§ 371 (c)(1),
(2) Date: Jan. 18, 2024

(87) PCT Pub. No.: WO2023/025540
PCT Pub. Date: Mar. 2, 2023

(65) Prior Publication Data
US 2024/0316913 A1     Sep. 26, 2024

(30) Foreign Application Priority Data

Aug. 26, 2021     (DE) ...................... 10 2021 122 112.9

(51) Int. Cl.
*B32B 41/00*          (2006.01)
*B32B 38/00*          (2006.01)
(52) U.S. Cl.
CPC .......... *B32B 41/00* (2013.01); *B32B 38/0004* (2013.01); *B32B 2581/00* (2013.01); *B32B 2605/00* (2013.01)
(58) Field of Classification Search
CPC . B32B 41/00; B32B 38/0004; B32B 2581/00; B32B 2605/00; B60J 10/45; B23P 19/047
(Continued)

(56) References Cited

U.S. PATENT DOCUMENTS

2013/0199696 A1*  8/2013  Schneider ......... A61F 13/49011
                                                      156/64
2016/0176089 A1    6/2016  Kast
                    (Continued)

FOREIGN PATENT DOCUMENTS

CN          105555569 A      5/2016
CN          105829017 A      8/2016
                    (Continued)

OTHER PUBLICATIONS

International Search Report (PCT/ISA/210) issued in PCT Application No. PCT/EP2022/071691 dated Nov. 11, 2022 with English translation (6 pages).

(Continued)

*Primary Examiner* — Michael N Orlando
*Assistant Examiner* — Joshel Rivera
(74) *Attorney, Agent, or Firm* — Crowell & Moring LLP

(57)          ABSTRACT

An application device for applying a seal to a body element of a vehicle, comprising a guiding apparatus to feed continuous material to an outlet apparatus. The application device has a first sensor apparatus to check a predefined end portion of the continuous material for the presence of at least one predefined defect mark. The outlet apparatus has a second sensor apparatus wherein, in the event that the at least one predefined defect mark is present in the predefined end portion, the second sensor apparatus senses an end position of the predefined at least one defect mark along a longitudinal direction of the continuous material. In the event that the at least one predefined defect mark is present in the predefined end portion, the outlet apparatus cuts off a rejection portion of the fed continuous material and feeds said rejection portion to a rejection apparatus.

15 Claims, 5 Drawing Sheets

(58) Field of Classification Search
USPC ..................... 156/60, 64, 350, 351, 378, 379
See application file for complete search history.

(56) References Cited

U.S. PATENT DOCUMENTS

| | | |
|---|---|---|
| 2016/0311297 A1 | 10/2016 | Kast et al. |
| 2019/0105976 A1 | 4/2019 | Thommes |
| 2019/0344489 A1 | 11/2019 | Krause |

FOREIGN PATENT DOCUMENTS

| | | |
|---|---|---|
| CN | 108712942 A | 10/2018 |
| DE | 10 2005 028 069 A1 | 5/2006 |
| DE | 10 2014 101 752 A1 | 3/2015 |
| DE | 10 2013 114 775 A1 | 6/2015 |
| DE | 20 2017 007 136 U1 | 9/2019 |
| DE | 10 2019 206 043 A1 | 10/2020 |
| EP | 1 733 839 A1 | 12/2006 |

OTHER PUBLICATIONS

German-language Written Opinion (PCT/ISA/237) issued in PCT Application No. PCT/EP2022/071691 dated Nov. 11, 2022 with English translation (9 pages).
German-language Search Report issued in German Application No. 10 2021 122 112.9 dated Apr. 7, 2022 with partial English translation (11 pages).
English translation of Chinese-language Office Action issued in Chinese Application No. 202280043515.2 dated Jan. 8, 2026 (9 pages).

* cited by examiner

APPLICATION DEVICE DESIGNED TO APPLY A SEAL TO A BODY ELEMENT OF A VEHICLE AND METHOD

BACKGROUND AND SUMMARY

This disclosure relates to an application device designed to apply a seal to a body element of a vehicle, and to a method for operating an application device for applying a seal to a body element of a vehicle.

Seals can be disposed on body elements of vehicles, such as doors, for example, so as to prevent the ingress of moisture into the vehicle. An application of seals to body elements can be performed in an automated manner by application devices. For this purpose, a material of the seal to be applied is supplied to the application device as a continuous material. The continuous material is wound on rolls and usually has lengths of 1000 to 1500 meters.

In order to avoid that defective continuous material is applied to the body element, it is provided that the continuous material is inspected for defects prior to being wound. Regions of the continuous material that include defects are marked with defect markings in the process. Defect markings can be embodied, for example, as paint applications which can extend along a defective longitudinal portion of the continuous material. Application devices have sensor installations which are designed to check the supplied continuous material for any above-mentioned defect markings that may be present. It is provided that an end portion of the continuous material, prior to its application as a sealing element, is checked for any defect markings that may be present and is applied to the body element only if the predetermined end portion does not include any defect markings.

Should there be at least one defect marking in the predetermined end portion, it is customary for an elimination portion of the continuous material that comprises the defect markings to be severed and eliminated by the application device, so as to avoid an application of defective continuous material.

It is disadvantageous in the prior art that the elimination portion, in addition to the marked region of the continuous material, has defect-free longitudinal portions, and an unnecessarily large amount of continuous material is consumed as a result. The unnecessarily large, eliminated region is derived from the customary sizing of the elimination portion. It is a widely used practice to detect only a beginning of the defect marking and not an end of the defect marking by the sensor installation. The elimination portion here, proceeding from the beginning of the defect marking, extends over a predetermined length. This length is specified at the outset and is independent of a length of the defect marking because the end of the defect marking is not taken into account. This definition of the elimination portion, irrespective of the length of the defect marking, can be traced back to the fact that known sensor installation are not designed to detect the end of the defect marking. In order to ensure that a defective portion is reliably diverted, the elimination portion is sized to be relatively large in order to allow for a safety margin. It is disadvantageous therein that a relatively large proportion of defect-free continuous material is eliminated, for example in the case of defect markings which have a relatively short length in comparison to the length of the defect marking. This leads to a higher consumption of material and to increased downtime of the application device, because it is impossible to apply the continuous material to body elements while the elimination portion is being eliminated.

DE 10 2019 206 043 A1 discloses a method and a system for producing a seal. It is provided in the method that a strand-shaped sealing element which can be cut to length is provided for producing a seal, in particular for a door or a door frame of a motor vehicle. The sealing element is checked for any defects present. Each of the defects identified is marked on the sealing element. It is provided that each longitudinal portion that includes at least one marking is removed.

Described in EP 1 733 839 A1 are a method and a device for forming a seal or a cover on a seal carrier or cover carrier, respectively, in particular on a vehicle door or a body cut-out. It is provided that a strand-shaped element which forms the seal is unwound from a roll or coil, and the unwound strand-shaped material is supplied to a carrier and is continuously connected to the carrier in the longitudinal direction of the strand. An end portion which corresponds to the length of the seal, or cover, is severed from the supplied strand-shaped material by a separating installation. It is provided that the unwound strand-shaped material is checked by a testing installation prior to being connected to the carrier, and end portions of the strand-shaped material which have been identified as defective are severed and eliminated as waste.

It is an object of the present disclosure to reduce the amount of eliminated defect-free continuous material.

A first aspect of the disclosure relates to an application device for applying a seal to a body element of a vehicle. The application device is a device which is designed to apply seals to the body elements of the vehicle in an automated manner. The body element can be, for example, a door or a door frame. The application device has a guide installation which is designed to supply continuous material to an outlet installation. In other words, the application device has the guide installation which is designed to receive continuous material and supply the latter to the outlet installation. The application device has a first sensor installation which is designed to check a predetermined end portion of the continuous material for the presence of at least one predetermined defect marking. In other words, it is provided that the application device has the first sensor installation which is provided to check the predetermined end portion for the presence of the predetermined defect marking, the end portion potentially having a predetermined length of the seal to be applied. The application device can be designed to guide the end portion of the continuous material along the first sensor installation for checking. Alternatively, the first sensor installation can be designed to detect the end portion in a receptacle and to check the end portion for the presence of the predetermined defect marking.

The outlet installation of the application device, in the absence of the predetermined defect marking, is designed to sever the predetermined end portion from the supplied continuous material and to apply to the body element. In other words, it is provided that the outlet installation is designed to apply the predetermined end portion to the body element if there is no predetermined defect marking on the predetermined end portion.

It is provided that the outlet installation has a second sensor installation which, in the presence of the at least one predetermined defect marking in the predetermined end portion, is designed to detect and end position of the defect marking along a longitudinal direction of the continuous material. In other words, it is provided that the sensor installation is designed to detect the end position of the defect marking in the predetermined end portion if the at least one predetermined defect marking in the predetermined end portion has been detected by the first sensor installation. The end position here can describe a location along the longitudinal direction of the continuous material at which the defect marking ends along a guiding direction of the continuous material. In contrast, a start position of the defect marking can be a position along the continuous material at which the respective defect marking is first detected by the second sensor installation, and which can thus be unwound from the role before the end position. As opposed to the prior art, the second sensor installation at the mouthpiece is not restricted to detecting the start position of the defect marking. Alternatively or additionally, the second sensor installation can detect the end position at which the defect marking ends. For example, a signal can be emitted by the second sensor installation when a drop is detected in a detected value, which indicates the presence of the defect marking detected by the second sensor installation. This drop can be a signal flank of the detection signal which can also be referred to as a descending flank. In this way, the offcut/elimination portion can be significantly shortened, as a result of which there is a reduction in material and lost time. The maximum length of the defect marking is no longer relevant for the setting of the application device.

It is provided that the outset installation, in the presence of the at least one predetermined defect marking, is designed to sever an elimination portion of the supplied continuous material and to supply to an elimination installation. In other words, the outlet installation, in the presence of the at least one predetermined defect marking, is designed not to apply the end portion to the body element, but instead sever the elimination portion of the supplied continuous material and supply to the elimination installation. An application of a defective portion of the continuous material can be prevented as a result.

It is provided that the elimination portion comprises a defective portion which is delimited by an end of the supplied continuous material and the end position of the predetermined defect marking along the longitudinal direction of the continuous material. In other words, the elimination portion extends at least across the defective portion of the continuous material. The defective portion here extends from that end of the supplied continuous material that may be, for example, a cutting point of the continuous material, wherein the previously applied end portion can be severed from the continuous material. The defective portion ends at the end position of the predetermined defect marking. The end position can be, for example, that end of the defect marking that faces away from the end position of the continuous material.

The disclosure results in the advantage that the elimination portion is a function of an end position of the defect marking. In this way, it is possible to evaluate an exact length of the defect marking. This results in the advantage that a length of the elimination portion can be established as a function of the length of the defect marking. A diversion of defect-free material can be minimized in this way.

The disclosure also comprises refinements which result in further advantages.

One refinement of the disclosure provides that the application device, in the presence of at least two predetermined defect markings, is designed to determine the defective portion of the elimination portion of the continuous material in such a way that this defective portion is delimited by one end of the supplied continuous material and the end position of the last one of the predetermined defect markings along the longitudinal direction of the continuous material. It is thus provided that the defective portion, in the presence of at least two predetermined defect markings, is delimited by one end of the supplied continuous material and the end position of the last one of the predetermined defect markings along the longitudinal direction of the continuous material. In other words, the application device is designed to sever the defective portion which extends from the end of the supplied continuous material to that end of the predetermined defect marking that is furthest away from the end of the supplied continuous material. This results in the advantage that a plurality of defect markings present in the continuous portion can be removed.

A refinement of the disclosure provides that the elimination portion comprises a safety margin portion, wherein the safety margin portion extends from the end position of the predetermined defect marking to a cutting location which has a predetermined safety margin spacing from the end position of the predetermined defect marking. In other words, it is provided that the elimination portion has the safety margin portion in addition to the defective portion. The elimination portion in this way comprises the defective portion, which extends from the end of the supplied continuous material to the end position of the predetermined defect marking, as well as the safety margin portion which extends from the end position of the predetermined defect marking to the cutting location, and has a predetermined safety margin spacing as a length along the longitudinal direction of the continuous material. This results in the advantage that a region that is situated in a vicinity of the defect marking is eliminated in addition to the region identified by the defect marking. It can be ensured as a result that invisible and marked defects in the continuous material are diverted.

A refinement of the disclosure provides that the predetermined safety margin spacing has a length of 120 millimeters to 200 millimeters. In other words, the safety margin portion defined by the safety margin spacing has a length of 120 millimeters to 200 millimeters.

A refinement of the disclosure provides that the predetermined safety margin spacing as a length of 130 millimeters to 190 millimeters.

The refinement of the disclosure provides that the predetermined safety margin portion has a length of 140 millimeters to 180 millimeters.

A refinement of the disclosure provides that the predetermined safety margin spacing has a length of 150 millimeters to 170 millimeters.

A second aspect of the disclosure relates to a method for operating an application device for applying a seal to a body element of a vehicle. In the method, continuous material is supplied to the application device by way of a guide installation of an outlet installation. The continuous material can be sealing material, for example. A predetermined end portion of the continuous material is checked for the presence of at least one predetermined defect marking by a sensor installation of the application device. In other words, it is provided that the predetermined end portion of the continuous material, which is to be applied as a sealing element to the body element, for example, is checked as to whether at least one of the predetermined defect markings, by which defects are identified, is situated in the end portion. It is provided that in the absence of the predetermined defect markings, the predetermined end portion is severed from the supplied continuous material by the outlet installation and applied to the body element. In other words, should none of the predetermined defect markings be detected in the first end portion by the sensor installation, the end portion thus being free of defects, the application of the end portion to the body element takes place, wherein the applied continuous material is severed by the outlet installation. Should the presence of the at least one predetermined defect marking in the predetermined end portion have been detected by the first sensor installation, it is provided that an end position of the defect marking along a longitudinal direction of the continuous material in the predetermined end portion is detected by a second sensor installation of the outlet installation. In other words, should at least one of the predetermined defect markings be situated in the end portion of the continuous material to be applied, it is provided that the end position of the detected defect marking is detected by the second sensor installation. In the presence of the at least one predetermined defect marking, an elimination portion of the supplied continuous material is severed by the outlet installation and supplied to a elimination installation. In other words, if at least one predetermined defect marking is detected, it is provided that no application of the end portion takes place, but the elimination portion of the continuous material is severed and supplied to the elimination installation instead. The elimination portion here comprises a defective portion which is delimited by the one end of the supplied continuous material and the end position of the predetermined defect marking along the longitudinal direction of the continuous material. In other words, the elimination portion which has the defective portion is supplied to the elimination installation by the outlet installation. The defective portion here extends from the end of the supplied continuous material to the end position of the predetermined defect marking along the longitudinal direction of the continuous material.

Further features of the disclosure are derived from the claims, the figures and the description of the figures. The features and combinations of features mentioned above in the description and the features and combinations of features mentioned in the description of the figures below and/or shown in the figures alone can be used not only in the respectively stated combination, but also in other combinations or alone.

BRIEF DESCRIPTION OF THE DRAWINGS

The disclosure will now be explained in more detail via preferred exemplary embodiment and with reference to the drawings in which.

DETAILED DESCRIPTION OF THE DRAWINGS

Figure 1:
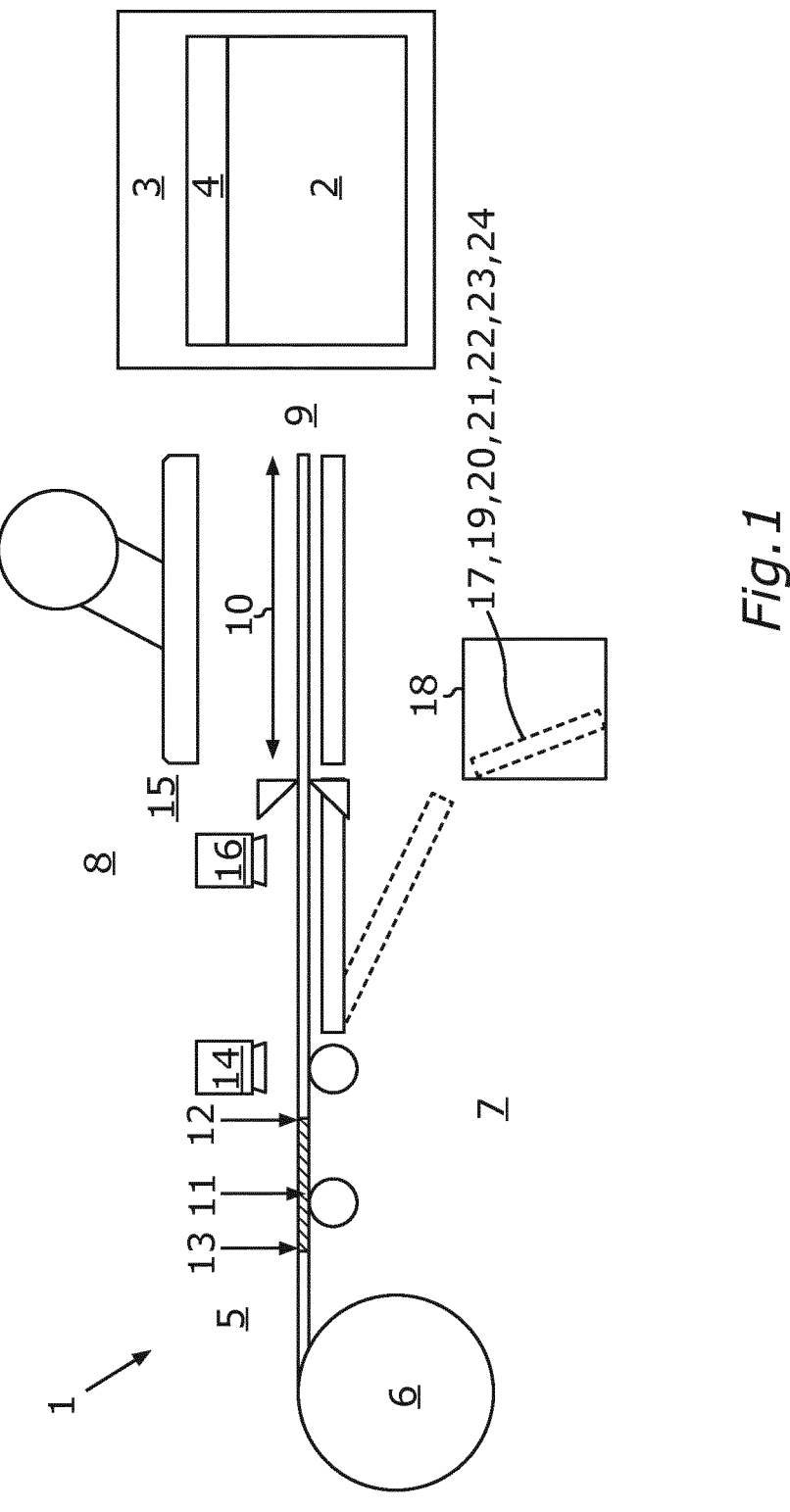
FIG. 1 shows a schematic illustration of an application device.

FIG. 1 shows a schematic illustration of an application device for applying a seal to a body element of a vehicle. The application device 1 can be provided to apply the seal 4 to the body element 2 of the vehicle 3. The body element 2 can be, for example, a door or a door frame. The seal 4 may be intended for application along at least one edge of the body element 2. The seal 4 can comprise a rubber and be provided as a continuous material 5 which can be wound on a roll 6. The application device 1 can have a guide installation 7 which can be designed to obtain the continuous material 5 from the roll 6 and to supply to an outlet installation 8 of the application device 1, which can be designed to sever a predetermined end portion 9, for example, via a cutting blade, which may have a predetermined end length 10, from the continuous material 5 and to apply the predetermined end portion 9 as the seal 4 to the body element 2. It can be provided that defect markings 11, which can have a start position 12 and an end position 13, are disposed on the continuous material 5. The defect markings 11 can be, for example, paint markings, adhesive tapes, or cuts in the continuous material 5, which can identify defects of the continuous material 5. In order to ensure that no end portion 9 which has a defect identified by the defect marking 11 is applied as the seal 4 to the body element 2, the application device 1 can have a first sensor installation 14 which can be provided to inspect the end portion 9 of the end length 10 for the presence of the defect marking 11, for example, via one or more sensors and/or imaging devices (e.g., cameras). The application device 1 can be provided to supply the inspected end portion 9 to the outlet installation 8 by way of the application device 1. The outlet installation 8 can be designed to sever the predetermined end portion 9 with a cutting tool 15, and to apply the end portion 9 to the body element 2. Should at least one of the defect markings 11 in the end portion 9 be identified by the first sensor installation 14, it can be provided that the outlet installation 8 via a second sensor installation 16, is designed to detect an end position 13 of the defect marking 11, for example, via one or more sensors and/or imaging devices (e.g., cameras), and to sever an elimination portion 17 of the supplied continuous material and 5, and to supply the elimination portion 17 to an elimination installation 18. The elimination portion 17 can include a defective portion 19 and a safety margin portion 20. The defective portion 19 can extend from a material start 21 of the continuous material 5, at which a previous end portion 5 may have been severed, to the end position 13 of the at least one defect marking 11. The safety margin portion 20 can extend from the end position 13 of the defect marking 11 to a cutting 22, which can be situated at a predetermined safety margin spacing 24 from the end position 13. Should a plurality of the defect markings 11 in the end portion 19 have been detected by the first sensor installation 14, it can be provided that the defective portion 19 extends from the material start 21 of the continuous material 5 to the end position 13 of the last one of the defect markings 11, which is disposed at the greatest distance from the material start 21 of the continuous material 5. It can be provided that the predetermined safety margin spacing 24 has a length, for example, of 120 to 200 millimeters, of 130 millimeters to 190 millimeters, of 140 to 180 millimeters, of 150 millimeters to 170 millimeters, or 160 centimeters.

Figure 2:
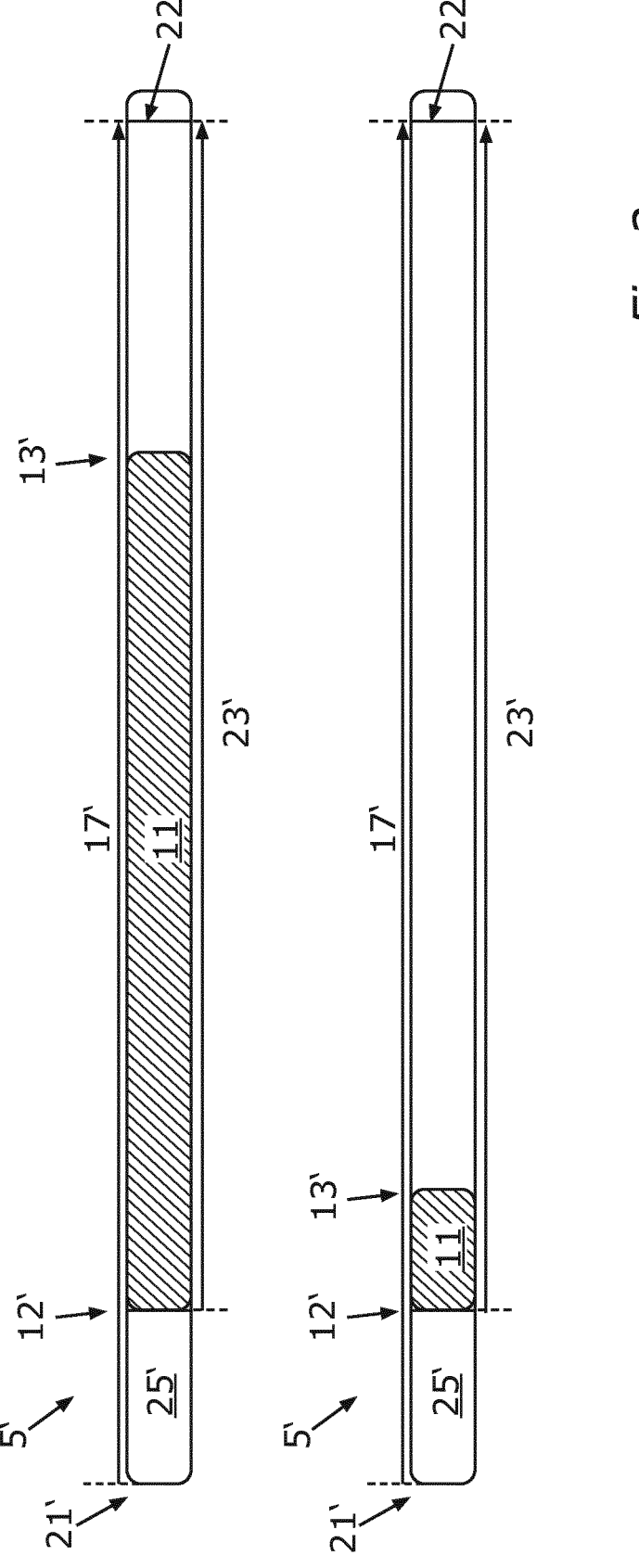
FIG. 2 shows a schematic illustration of elimination portions as per the prior art.

FIG. 2 shows a schematic illustration of elimination portions as per the prior art. It is provided as per the prior art that the presence of at least one defect marking 11' within an end portion 9' of an end length 10' is detected by a first sensor installation 14'. As per the prior art, should a defect marking 11 have been detected it can be provided that the end portion 9' is inspected via the second sensor installation 16', so as to detect a start position 12' of the defect marking 11. The outlet installation 8' here can be designed in such a manner that, proceeding from the start position 12' of the defect marking 11', a cutting point 22 is determined at a predetermined safety margin spacing 23' from the start position 12'. The elimination portion 17' to be severed here can comprise a start portion 25', which can extend from the start 21' of the continuous material 5' to the start position 12' of the defect marking 11', and the region which is defined by the safety margin spacing 23' and can extend from the start position 12' of the defect marking 11' to the cutting point 22'. It can be particularly disadvantageous here that a relatively large proportion of defect-free continuous material 5', which may be situated between the end position 13' and the cutting point 22', is eliminated in the case of relatively short defect markings 11.

Figure 3:
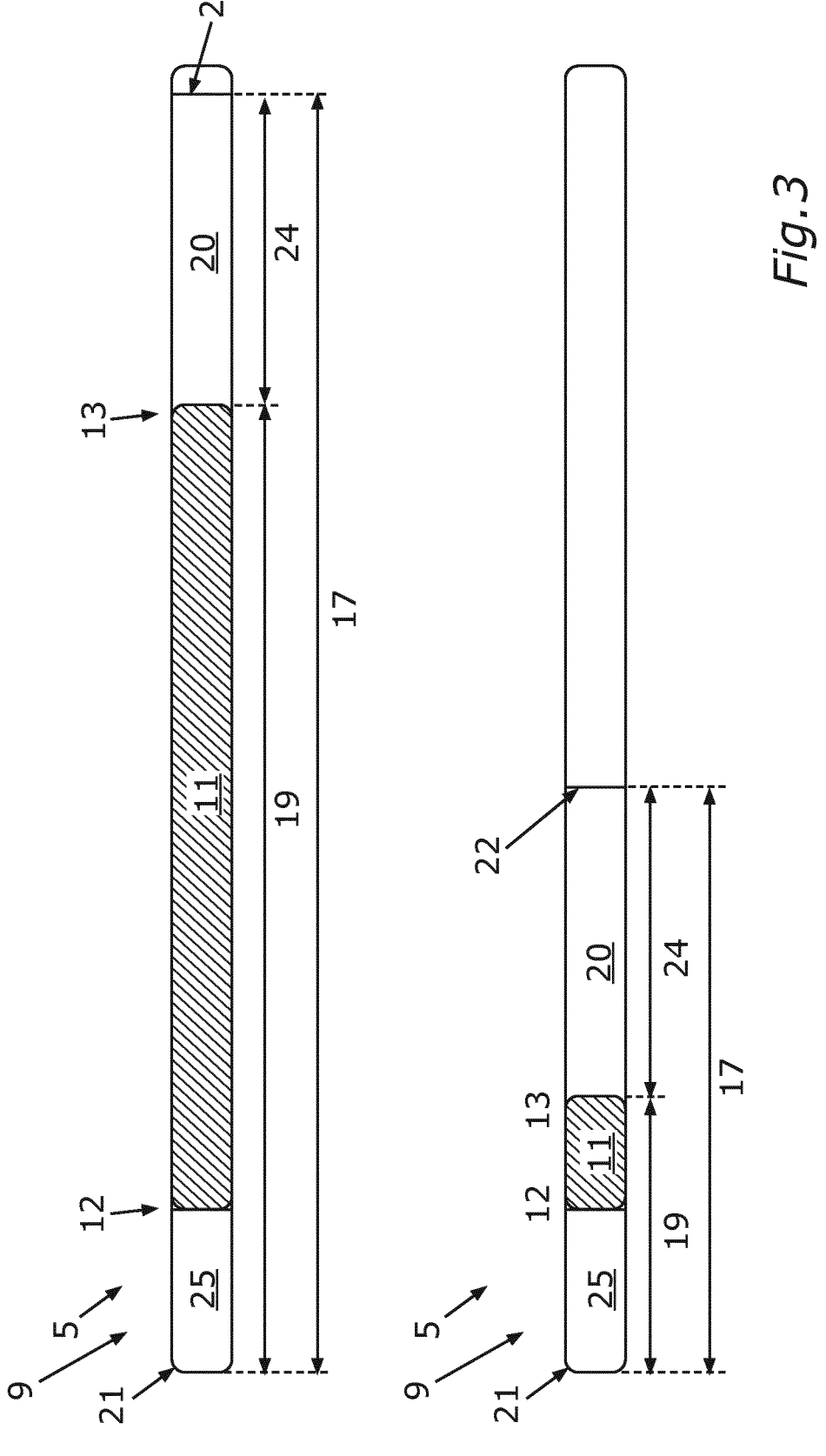
FIG. 3 shows a schematic illustration of elimination portions.

FIG. 3 shows a schematic illustration of elimination portions. As opposed to the elimination portions 17' illustrated in FIG. 2, which can be eliminated by application devices 1' as per the prior art, FIG. 3 shows elimination portion 17 which can be eliminated by the application device 1. The elimination portions 17 which can be eliminated by the application device 1 can include the defective portion 19 which can extend from the material start 21 of the continuous material 5 to the end position 13 of the defect marking 11.

FIG. 3 shows a schematic illustration of elimination portions. As opposed to the elimination portions 17' illustrated in FIG. 2, which can be eliminated by application devices 1' as per the prior art, FIG. 3 shows elimination portions 17 which can be eliminated by the application device 1. The elimination portions 17 which can be eliminated by the application device 1 can include the defective portion 19 which can extend from the material start 21 of the continuous material 5 to the end position 13 of the defect marking 11. In order to enable a reliable diversion of defects, it is moreover provided that the safety margin portion 20 is cut out in addition to the defective portion 19, which safety margin portion 20 can extend from the end position 13 of the defect marking 11 to the cutting location 22, which may have the predetermined safety margin spacing 24 from the end position 13. The predetermined safety margin spacing 24, as opposed to the predetermined safety margin spacing 23' as per the prior art, thus relates to the end position 13 and not to the start position 12. This results in the advantage that shorter defect-free portions of the continuous material 5 are diverted, in particular in the case of comparatively short defect markings 11.

Figure 4:
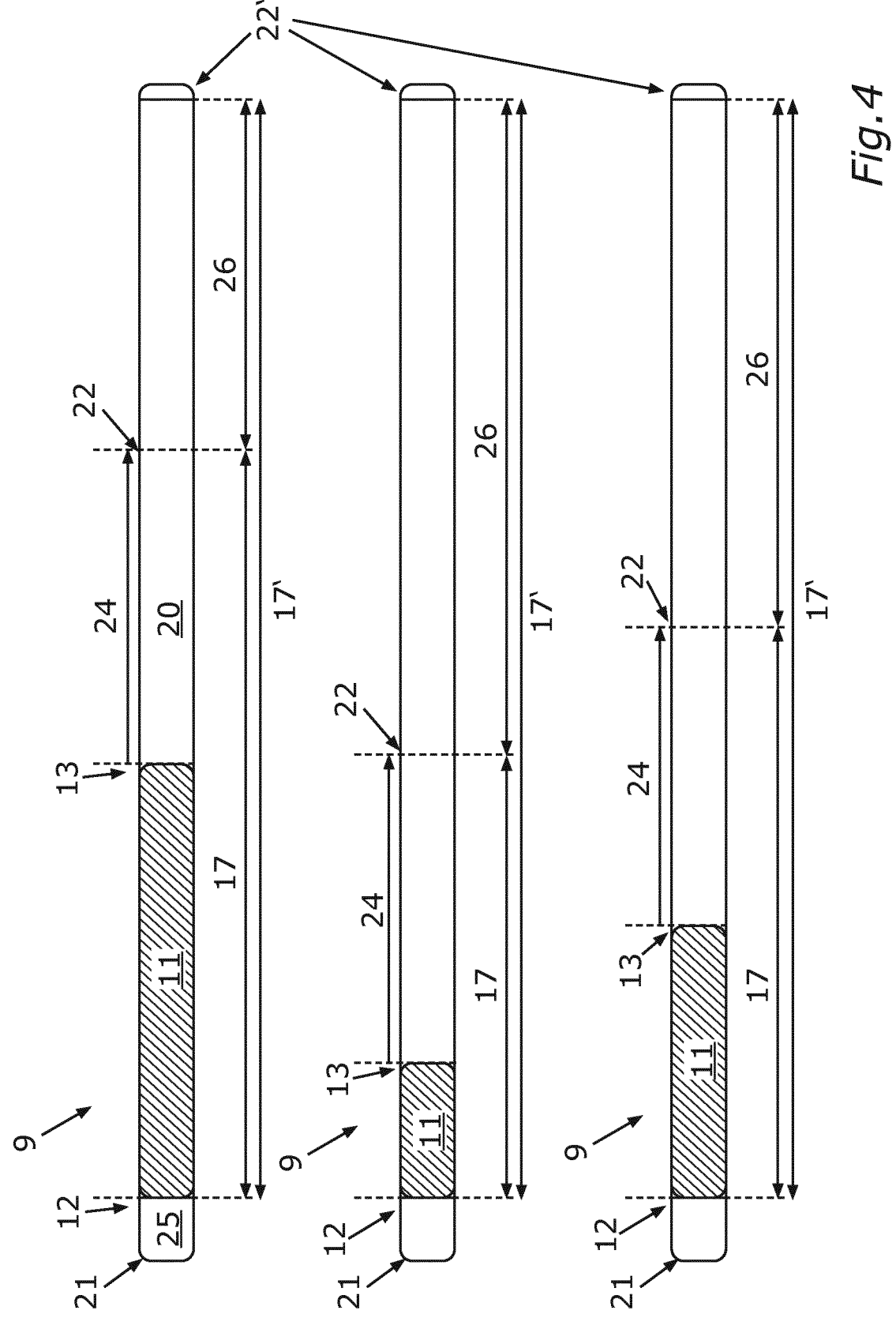
FIG. 4 shows a schematic illustration of a comparison of elimination portions.

FIG. 4 shows a schematic illustration of a comparison between elimination portions as per the prior art and elimination portions according to the present disclosure. Shown are potential elimination portions 17' as per the prior art, and potential elimination portions 17 according to the disclosure, which can result for defect markings 11 of different lengths. Length differences between the elimination portion lengths of the elimination portions 17 according to the disclosure and the elimination portion lengths of the elimination portions 17' as per the prior art are illustrated by a length difference 26. The length difference 26 thus characterizes a portion of the continuous material 5 which is not eliminated by the disclosure, as opposed to the prior art; and thus also represents a spacing between a cutting location 22 and a cutting location 22' as per the prior art.

Figure 5:
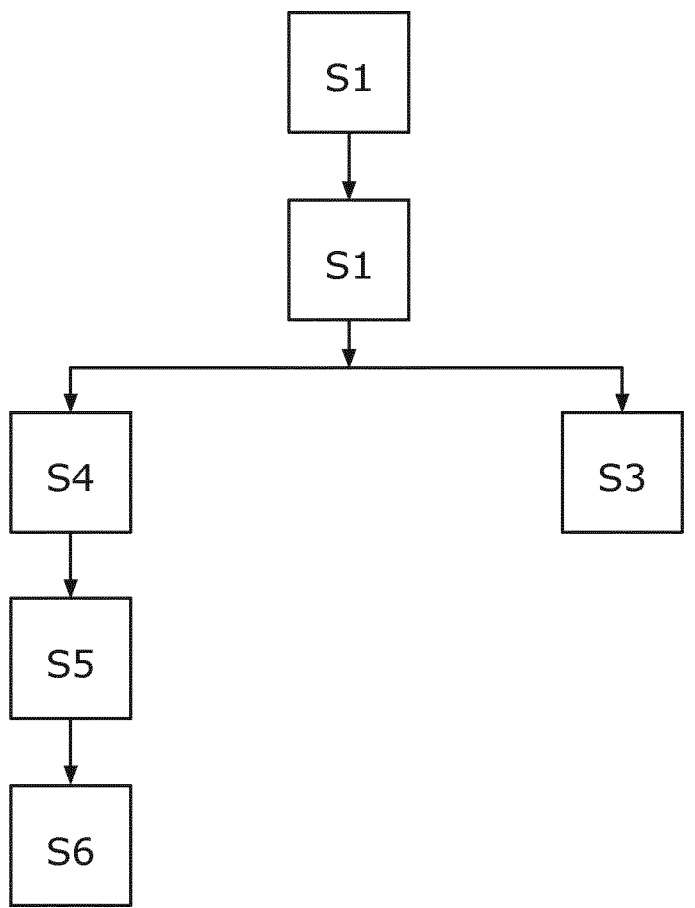
FIG. 5 shows a schematic illustration of a method for operating an application device.

FIG. 5 shows a schematic illustration of a method for operating an application device. The method can be provided for operating an application device 1 for applying a seal 4 to a body element 2 of a vehicle 3. The method may be implemented via a control unit (not shown) comprising a microcontroller including a ROM/RAM, a microprocessor, a memory, and/or the like, and that executes a program stored in the ROM or the memory, thereby controlling the individual components described above and herein.

In a method step S1, continuous material 5 can be supplied by way of a guide installation 7 to an outlet installation 8. In a step S2, a predetermined end portion 9 of the continuous material 5 can be checked for the presence of at least one predetermined defect marking 11 by a first sensor installation 14. A further course of the method can depend on whether a defect marking in the predetermined end portion 9 of the continuous material 5 is detected by the first sensor installation 14 in the method step S2. In a method step S3, in the absence of the predetermined defect marking 11, the predetermined end portion 9 can be severed from the supplied continuous material 5 by the outlet installation 8 and applied to the body element.

In a method step S4, in the presence of the at least one predetermined defect marking 11 in the predetermined end portion 9, an end position 13 of the defect marking 11 along a longitudinal direction of the continuous material 5 can be detected by a second sensor installation 16 of the outlet installation. Subsequently, in a method step S5, in the presence of the at least one predetermined defect marking 11, an elimination portion 17 of the supplied continuous material 5 can be severed by the outlet installation 8 in a method step S5 and supplied to an elimination installation 18 in a method step S6, wherein the elimination portion comprises a defective portion which is delimited by one end of the supplied continuous material 5 and the end position 13 of the predetermined defect marking 11 along the longitudinal direction of the continuous material 5.

So-called continuous door main seals 4 (eTHD) as continuous material 5 can be wound on rolls 6 as load carriers. The wound continuous material 5 here can have lengths of approx. 1000 m to 1500 m. The continuous material 5 can have faults, joints and defects. Portions of the continuous material 5 that include defects must not be applied as seals 4 to body elements 2 such as, for example, doors of a vehicle 3. It is customary for these defects to be provided with a colored mark by defect markings 11 before being wound onto rolls 6, so that the defects marked by the defect markings 11 can be detected and cut out prior to the application by the application device 1. A maximum length of a defect marking 11 is to be adapted to the application devices 1, because comparatively long defect markings 11 can lead to defects on the body element 2 of the vehicle 3. A loss in terms of material and time, which is to be reduced, is caused by the elimination of the elimination portion 17. The loss in time can be traced back to the required process time when diverting the elimination portion 17.

A method for operating an application device 1 as per the prior art for diverting defects in the application head is performed as follows. A first sensor installation 14, which is typically situated at the distance of a complete door length away from the application head, permanently inspects a black rubber surface of the continuous material 5 running past. The first sensor installation 14 checks whether a defect marking 11 is located in the end portion 9, which defect marking 11 may be, for example, yellow or white and thus differ from the black color of the continuous material 5. It is thus checked whether there is a defect marking 11 within the end portion 9.

A second sensor installation 16 which is disposed just before the outlet/mouthpiece, or a cutting blade, of the application head permanently inspects the black rubber surface of the continuous material 5 running past, so as to identify when the previously detected defect marking 11 reaches the region of the mouthpiece. When the second sensor installation 16 detects a start position 12, i.e. a beginning of the defect marking 11, a defined quantity of offcut/safety margin portion 20 of always the same length is diverted so as to reliably convey the defect completely out of the application head before the cutting blade of the application head cuts off this piece as the elimination portion 17 and the next end portion 9 can be applied as the seal 4 to a subsequent door. This defined offcut/elimination portion 17 of always the same length must be longer than the longest possible and/or permissible defect marking 11. An unnecessary loss in terms of material and also time is thus created in particular in the case of comparatively short defect markings 11. The problem can be traced back to the fact that the control unit/second sensor installation 16 can only detect the start position 12 and not an end position 13 of the defect marking 11. As a result, unnecessarily long elimination portions 17 are at times eliminated, this resulting in defect-free continuous material 5 being lost. This also leads to a loss in time, because no application to the body element 2 is possible during the time in which the application head diverts the elimination portion 17. The control unit cannot differentiate whether a short or a long defect marking 11 has to be diverted; therefore, the longest possible defect marking 11 must always be assumed.

It is proposed for solving the set of issues that the second sensor installation 16 at the mouthpiece detects not only the start position 12 of the defect marking 11 but also the end position 13. A signal "descending flank" is transmitted by the second sensor installation 16 to the control unit only when a detected value drops, which indicates the presence of a defect marking 11 detected by the second sensor installation 16. In this way, the offcut/elimination portion 17 can be significantly shortened, the loss of material and time being reduced as a result. The maximum length of the defect marking 11 is no longer relevant for setting the application device 1; comparatively long defect markings 11 and comparatively short defect markings 11 always lead to a reliable complete discharge of the complete defect marking 11, always having a respective offcut/safety margin portion 20 of identical short length. The disclosure is suitable for mobile as well as stationary application heads.

LIST OF REFERENCE SIGNS

1 Application device
2 Body element
3 Vehicle
4 Seal
5 Continuous material
6 Roll
7 Guide installation
8 Outlet installation
9 End portion
10 End length of the end portion
11 Defect marking
12 Start position of the defect marking
13 End position of the defect marking
14 First sensor installation
15 Cutting tool
16 Second sensor installation
17 Elimination portion
18 Elimination installation
19 Defective portion
20 Safety margin portion
21 Material start
22 Cutting location of the elimination portion
23 Safety margin spacing from the start position

24 Safety margin spacing from the end position
25 Start portion
26 Length difference
S1-S6 Method steps

What is claimed is:

1. An application device for applying a seal to a body element of a vehicle, the application device comprising:
   a guide to supply continuous material to an outlet of the application device;
   a first imaging sensor or device to check a predetermined end portion of the continuous material for the presence of at least one predetermined defect marking; and,
   a second imaging sensor or device positioned adjacent the outlet and disposed immediately upstream of a cutting blade of the outlet installation which, in the presence of the at least one predetermined defect marking in the predetermined end portion, detects an end position of the predetermined at least one defect marking along a longitudinal direction of the continuous material, the end position being determined based on a descending flank of a detection signal corresponding to the presence of the defect marking;
   wherein in the absence of the predetermined defect marking in the predetermined end portion, a cutting blade associated with the outlet severs the predetermined end portion of the supplied continuous material for application to the body element;
   wherein in the presence of the at least one predetermined defect marking in the predetermined end portion, the cutting blade severs an elimination portion of the supplied continuous material for supply to an elimination installation, the elimination portion comprising (i) a defective portion which is delimited by a material start of the supplied continuous material and the end position of the predetermined defect marking along the longitudinal direction of the continuous material and (ii) a safety margin portion extending from the end position of the predetermined defect marking to a cutting location having a predetermined safety margin spacing from the end position.

2. The application device according to claim 1, wherein in the presence of at least two predetermined defect markings, the defective portion is delimited by a material start of the supplied continuous material and the end position of a last one of the predetermined defect markings along the longitudinal direction of the continuous material.

3. The device according to claim 1, wherein the elimination portion comprises a safety margin portion extending from the end position of the predetermined defect marking to a cutting location having a predetermined safety margin spacing from the end position of the predetermined defect marking.

4. The device according to claim 3, wherein the predetermined safety margin spacing has a length of 120 mm to 200 mm.

5. The device according to claim 3, wherein the predetermined safety margin spacing has a length of 130 mm to 190 mm.

6. The device according to claim 3, wherein the predetermined safety margin spacing has a length of 140 mm to 180 mm.

7. The device according to claim 3, wherein the predetermined safety margin spacing has a length of 150 mm to 170 mm.

8. A method for operating an application device for applying a seal to a body element of a vehicle, the method comprising:

supplying continuous material to an outlet of the appli-
cation device by way of a guide;

checking a predetermined end portion of the continuous
material for the presence of at least one predetermined
defect marking by a first imaging sensor or device;

severing the predetermined end portion from the supplied
continuous material and applying it to the body ele-
ment, in the absence of the predetermined defect mark-
ing;

detecting an end position of the defect marking along a
longitudinal direction of the continuous material, in the
presence of the at least one predetermined defect mark-
ing in the predetermined end portion, by a second
imaging sensor or device positioned adjacent the outlet
and disposed immediately upstream of a cutting blade
of the outlet installation, wherein the end position is
determined based on a descending flank of a detection
signal corresponding to the presence of the defect
marking; and, severing an elimination portion of the supplied continu-
ous material, in the presence of the at least one prede-
termined defect marking, and supplying the elimination
portion to an elimination location;

wherein the elimination portion comprises (i) a defective
portion delimited by a material start of the supplied
continuous material and the end position of the prede-
termined defect marking along the longitudinal direc-
tion of the continuous material and (ii) a safety margin
portion extending from the end position of the predetermined defect marking to a cutting location having a
predetermined safety margin spacing from the end
position.

9. The method according to claim 8, wherein severing is
performed by a cutting blade.

10. The method according to claim 8, wherein in the
presence of at least two predetermined defect markings, the
defective portion is delimited by a material start of the
supplied continuous material and the end position of a last
one of the predetermined defect markings along the longi-
tudinal direction of the continuous material.

11. The method according to claim 8, wherein the elimi-
nation portion comprises a safety margin portion extending
from the end position of the predetermined defect marking
to a cutting location having a predetermined safety margin
spacing from the end position of the predetermined defect
marking.

12. The method according to claim 11, wherein the
predetermined safety margin spacing has a length of 120 mm
to 200 mm.

13. The method according to claim 11, wherein the
predetermined safety margin spacing has a length of 130 mm
to 190 mm.

14. The method according to claim 11, wherein the
predetermined safety margin spacing has a length of 140 mm
to 180 mm.

15. The method according to claim 11, wherein the
predetermined safety margin spacing has a length of 150 mm
to 170 mm.

* * * * *